United States Patent [19]

Oshiba et al.

[11] Patent Number: 5,307,500
[45] Date of Patent: Apr. 26, 1994

[54] INTEGRATED CIRCUIT DEVICE WITH STAND-BY CANCELLATION

[75] Inventors: Yukio Oshiba, Soraku; Yasushi Okino, Nara, both of Japan

[73] Assignee: Sharp Kabushiki Kaisha, Osaka, Japan

[21] Appl. No.: 644,334

[22] Filed: Jan. 23, 1991

[30] Foreign Application Priority Data

Feb. 30, 1990 [JP] Japan .................................. 1-21438

[51] Int. Cl.⁵ ............................................. G06F 3/02
[52] U.S. Cl. .................................. 395/800; 395/550; 364/143; 364/270; 364/270.6; 364/271.9; 364/DIG. 1; 364/DIG. 2; 365/229
[58] Field of Search ............... 395/800, 425, 200, 550; 364/270.2, 270.1, 270.3, 270.6, 270.7, 271.5, DIG. 1, DIG. 2, 270, 270.5, 271.9; 365/229

[56] References Cited

U.S. PATENT DOCUMENTS

| | | | |
|---|---|---|---|
| 3,843,838 | 10/1974 | Wanek | 360/33.1 |
| 4,050,096 | 9/1977 | Bennett et al. | 395/425 |
| 4,486,827 | 12/1984 | Shima et al. | 395/725 |
| 4,538,902 | 9/1985 | Inuzuka et al. | 355/209 |
| 4,802,120 | 1/1989 | McCoy | 395/550 |
| 4,965,793 | 10/1990 | Plozin et al. | 370/94.1 |
| 5,019,966 | 5/1991 | Saito et al. | 395/775 |
| 5,043,881 | 8/1991 | Hamazaki | 395/700 |
| 5,225,989 | 7/1993 | Kawamura et al. | 364/474.11 |

OTHER PUBLICATIONS

National Semiconductor, "Logic databook—vol. II," 1984, pp. 4-250 to 4-251.

Primary Examiner—Alyssa H. Bowler
Assistant Examiner—Dzung C. Nguyen
Attorney, Agent, or Firm—Nixon & Vanderhye

[57] ABSTRACT

An integrated circuit device having a processing unit (3) with a plurality of input terminals (I1–In) and adapted to cancel its stand-by mode when a pulse-like control signal (A) having a predetermined duration is received by one of the input terminals. The integrated circuit device includes a plurality of external terminals (T1–Tn) for receiving signals and a plurality of control signal generating circuits (C1–Cn) each having an input connected to a corresponding one of the external terminals. Each control signal generating circuit (C1–Cn) has an output terminal connected to a corresponding one of the input terminals of the processing unit (3). Each of the control signal generating circuits has a D flip-flop (4) for, on receiving a pulse signal (R) for canceling the stand-by mode from the processing unit (3), elongating a duration of the pulse signal to a predetermined duration.

3 Claims, 2 Drawing Sheets

INTEGRATED CIRCUIT DEVICE WITH STAND-BY CANCELLATION

BACKGROUND OF THE INVENTION

1. Field of the Invention

The present invention relates to an integrated circuit device such as a microcomputer and, more particularly to an integrated circuit device which can be set to a stand-by mode.

2. Description of the Related Art

A large-scale integrated circuit such as a microcomputer has a stand-by mode in which its operation is temporarily suspended for the purpose of reducing electric power consumption. When the microcomputer is set to the stand-by mode, a microprocessor of the microcomputer stops execution of a program. The stand-by mode is canceled to enable the microprocessor to execute the program when a stand-by cancel signal is supplied to the microcomputer from a peripheral unit. In general, such a microcomputer uses a plurality of types of stand-by cancel signals, and the kind of the job to be performed by the microcomputer after the canceling of the stand-by mode is determined by the type of the stand-by canceling signal. A predetermined period of time, referred to as "transient period" is required for such a microcomputer before the job is commenced after receipt of the stand-by cancel signal. In order to cancel the stand-by mode, each of the stand-by cancel signals has to be maintained during this transient period.

As a consequence, each peripheral unit is required to have a complicated oscillation circuit capable of producing, as the stand-by cancel signal, a pulse signal having a duration equal to the transient period. In addition, each peripheral unit cannot perform another task during this transient period.

SUMMARY OF THE INVENTION

Accordingly, an object of the present invention is to provide an integrated circuit device such as a microcomputer which enables cancellation of a stand-by mode without requiring a stand-by cancel signal to be maintained during the transient period.

The object of the invention can be achieved by an integrated circuit device having a processing unit with a plurality of input terminals and adapted to cancel its stand-by mode when a pulse-like control signal having a predetermined duration is received by one of said input terminals, said integrated circuit device comprising: a plurality of external terminals for receiving signals from the outside; and a plurality of control signal generating circuits each having an input connected to corresponding one of said external terminals and an output connected to corresponding one of said input terminals of said processing unit, each of said control signal generating circuits having means for, on receiving a pulse signal for canceling the standby mode of said processing unit through a corresponding external terminal, elongating a duration of said pulse signal to said predetermined duration.

The integrated circuit device of the present invention can cancel the stand-by mode by application of a pulse which has a very short duration, so that peripheral or external units connected to this device need not to be equipped with a complicated oscillation circuit for generating a pulse having a large duration equal to the transient period.

Further objects and advantages of the present invention will be apparent from the following description, reference being had to the accompanying drawings wherein a preferred embodiment of the present invention is clearly shown.

DESCRIPTION OF THE PREFERRED EMBODIMENTS

Figure 1:
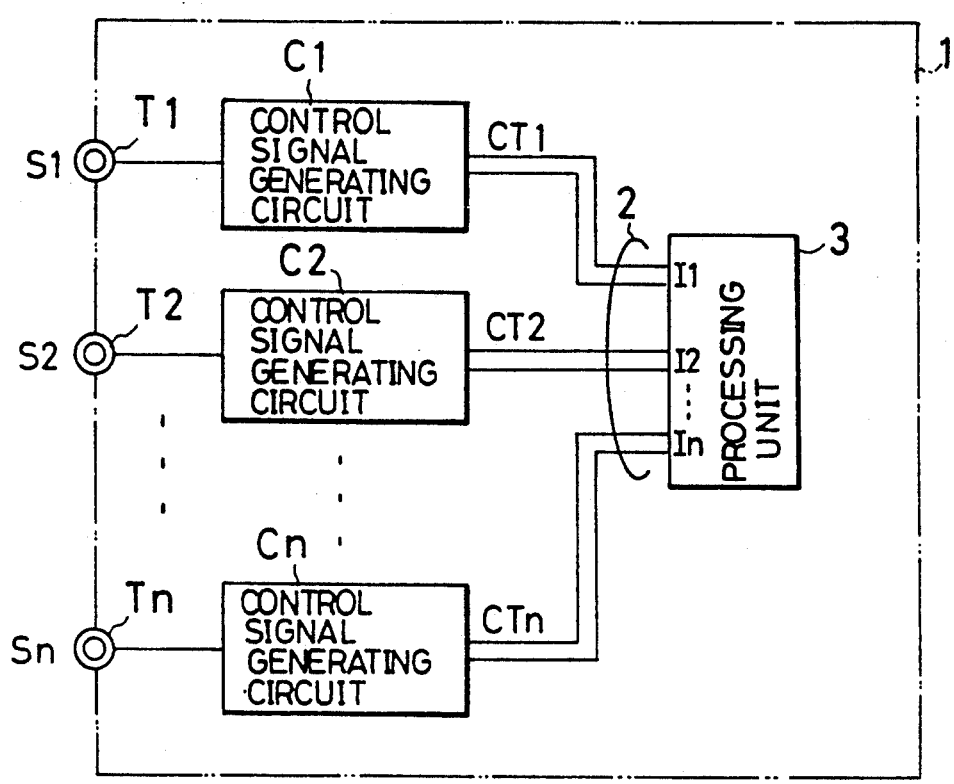
FIG. 1 is a block diagram of an embodiment of the integrated circuit device in accordance with the present invention.

Referring first to FIG. 1, an integrated circuit device 1 has a plurality of external terminals T1, T2, . . . , Tn (collectively designated "T"). Each external terminal Ti (i=1 to n) is connected to a corresponding one of control signal generating circuits C1 to Cn (collectively referred to as "C"). Each control signal generating circuit Ci (i=1 to n) produces control signal CTi (i=1 to n) and delivers this signal to a corresponding input terminal Ii (i=1 to n) of a processing unit 3 such as a microprocessor through a bus line 2.

Figure 2:
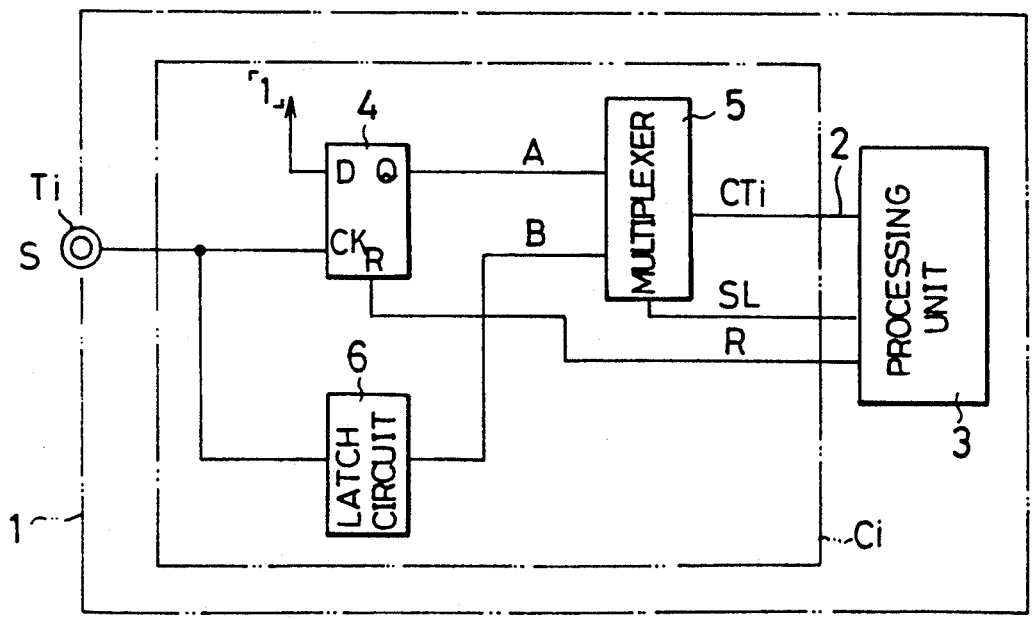
FIG. 2 is an illustration of the construction of one of control signal generating circuits incorporated in the integrated circuit device shown in FIG. 1.

As seen from FIG. 2, each control signal generating circuit Ci has a D-type flip-flop 4. The flip-flop 4 has a clock terminal CK which receives a pulse signal (referred to as "demand" signal, hereinafter) when a stand-by cancel signal is inputted through the external terminal Ti from an external unit (not shown). The data input terminal D of the flip-flop 4 is permanently set to a high level, i.e., logical value "1". A signal A obtained at the output terminal Q of the flip-flop 4 is delivered to one of the input terminals of a multiplexer 5. The other input terminal of the multiplexer 5 receives a signal B delivered from a latch circuit 6 which is connected to the external terminal Ti. The multiplexer 5 also receives a select signal SL delivered from the processing unit 3.

Figure 3:
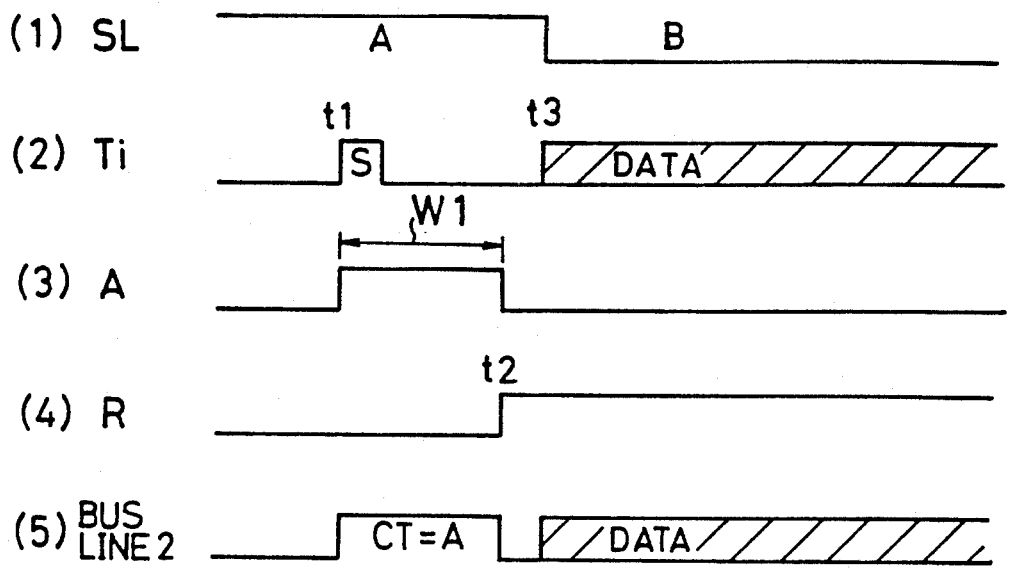
FIG. 3 is a time chart for explaining the operation of the integrated circuit device shown in FIG. 1.
Figure 4:
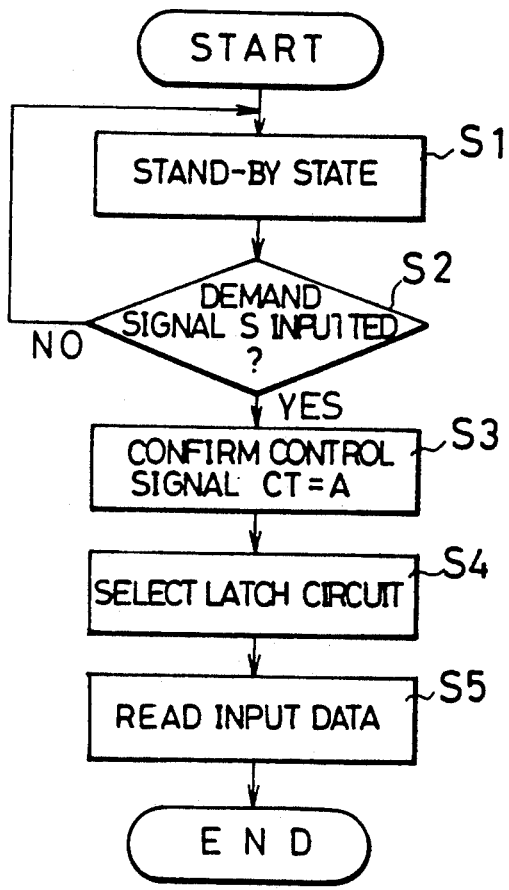
FIG. 4 is a flow chart explanatory of the operation of the integrated circuit device shown in FIG. 1.

FIG. 3 is a time chart for explaining the operation of the integrated circuit device 1, while FIG. 4 is a flow chart showing the operation process. The operation of the integrated circuit device 1 will be described with reference to FIGS. 3 and 4. The operation of the integrated circuit device 1, in a case where a demand signal S is inputted to one of the external terminals T, is as follows. Referring to FIG. 4, the integrated circuit device 1 has been set to the stand-by mode in Step S1. In this mode, the processing unit 3 supplies a select signal SL (see 1 of FIG. 3) to the multiplexer 5, thereby selecting the flip-flop 4.

In Step S2, when it is detected that a pulse demand signal S (see (2) of FIG. 3) is supplied to the external terminal Ti at the time T1, the output signal A of the flip-flop 4 is switched, for example, from "Low" to "High" in response to the edge of the rise of this demand signal S. The multiplexer 5 delivers this high level signal as the control signal CTi to the bus line 2 as shown in (5) of FIG. 3. Thus, in Step S2, the processing unit 3 waits for the demand signal S to be inputted.

When it is determined that the demand signal S has been inputted in step S2 by detecting the change of the level of the control signal CTi on the bus 2, i.e., the level of an input terminal I of the processing unit 3, the process proceeds to Step S3. In Step S3, the processing unit 3 confirms the control signal CTi which has been received by the input terminal I through the bus line 2. In Step S4, the processing unit 3 delivers, at the time t2, a reset signal R (see (4) of FIG. 3) to the flip-flop 4, so that the output signal A is switched from "high" to "low" level. Then, the processing unit 3 switches the level of the select signal SL at the time t3 whereby the multiplexer 5 selects the latch circuit 6. Thereafter, data which is inputted through the external terminal Ti is delivered to the bus line 2 via the latch circuit 6 and the multiplexer 5 and read by the processing unit 3.

As will be understood from the foregoing description of the embodiment of the integrated circuit device according to the present invention, it is not necessary to produce a pulse signal having a duration equal to the period W1 (see (3) of FIG. 3), and the stand-by mode of the integrated circuit device 1 can be canceled by a single pulse having a short duration. This makes it possible to remarkably simplify the circuitries of peripheral units.

The integrated circuit device 1 has a plurality of control signal generating circuits C1 to Cn corresponding to the external terminals T1 and Tn. The output of one of these control signal generating circuits is inputted to corresponding one of the input terminals I1 to In of the processing unit 3. Therefore, although the external terminals T1 to Tn receive the same single pulse as the demand signal, the integrated circuit device 1 can easily identify the external terminal to which the demand signal is supplied and perform the operation corresponding to the identified external terminal after the stand-by mode is canceled.

Many widely different embodiments of the present invention may be constructed without departing from the spirit and scope of the present invention. It should be understood that the present invention is not limited to the specific embodiment described in this specification, except as defined in the appended claims.

We claim:

1. An integrated circuit device comprising:
   a processing unit which selectively enters a stand-by mode, the processing unit having a plurality of processing unit terminals
      for sending a turning off signal to each of a plurality of control signal generating circuits;
      for receiving a pulse-like cancellation control signal when the stand-by mode of the processing unit is to be canceled; and
      for receiving data from at least one of said plurality of control signal generating circuits;
   a plurality of device input terminals each for receiving a unique cancellation request signal requesting cancellation of the stand-by mode;
   the plurality of control signal generating circuits each having an input connected to a corresponding one of said device input terminals and an output connected to a corresponding one of said processing unit input terminals of said processing unit, each of said control signal generating circuits having
      means for, on receiving a cancellation request signal, providing a cancellation control signal for the processing unit to cancel the stand-by mode;
      means for turning off said cancellation control signal in response to said turning off signal from said processing unit;
      means for sending said cancellation control signal to said processing unit;
      means for receiving data from one of said device input terminals; and
      means for sending said data to said processing unit;
   wherein said processing unit determines which of a plurality of operations are to be performed thereby after cancellation of the stand-by mode in accordance with which of its processing unit input terminals receives the cancellation request signal;
   wherein at least one of said control signal generating circuits includes a multivibrator having a clock terminal connected to a corresponding device input terminal, a latch circuit having an input connected to said corresponding device input terminal, and a multiplexer for connecting a selected one of:
      (1) an output of said multivibrator;
      (2) an output of said latch circuit to a corresponding one of the processing unit input terminals.

2. An integrated circuit device according to claim 1, wherein said integrated circuit device is a microcomputer formed on a single semiconductor substrate.

3. An integrated circuit device according to claim 1, wherein the multivibrator is a D-flip flop.

* * * * *

UNITED STATES PATENT AND TRADEMARK OFFICE
CERTIFICATE OF CORRECTION

PATENT NO. :   5,307,500
DATED      :   April 26, 1994
INVENTOR(S):   Yukio OSHIBA Et al It is certified that error appears in the above-indentified patent and that said Letters Patent is hereby corrected as shown below:

On title page, item [30] should read as follows:

--January 30, 1990 [JP]   Japan............2-21438--

Signed and Sealed this

Sixteenth Day of August, 1994

Attest:

BRUCE LEHMAN

Attesting Officer          Commissioner of Patents and Trademarks